(12) United States Patent
Zarabadi et al.

(10) Patent No.: US 7,293,460 B2
(45) Date of Patent: *Nov. 13, 2007

(54) MULTIPLE-AXIS LINEAR ACCELEROMETER

(75) Inventors: Seyed R. Zarabadi, Kokomo, IN (US); John C. Christenson, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/109,347

(22) Filed: Apr. 19, 2005

(65) Prior Publication Data

US 2006/0207328 A1    Sep. 21, 2006

Related U.S. Application Data

(63) Continuation-in-part of application No. 11/081,427, filed on Mar. 16, 2005, now abandoned.

(51) Int. Cl.
*G01P 15/125* (2006.01)

(52) U.S. Cl. .................................. 73/514.32

(58) Field of Classification Search ............. 73/514.01, 73/504.04, 504.02, 504.12, 504.14, 510, 73/514.28, 514.24, 514.32, 514.29, 514.38, 73/514.36
See application file for complete search history.

(56) References Cited

U.S. PATENT DOCUMENTS

| | | | | |
|---|---|---|---|---|
| 2,912,657 A | 11/1959 | Schaevitz | .................. | 336/30 |
| 2,916,279 A | 12/1959 | Stanton | .................. | 264/1 |
| 4,435,737 A | 3/1984 | Colton | .................. | 361/280 |
| 4,699,006 A | 10/1987 | Boxenhorn | .................. | 73/517 |
| 4,736,629 A | 4/1988 | Cole | .................. | 73/517 |
| 4,805,456 A | 2/1989 | Howe et al. | .................. | 73/517 |

(Continued)

FOREIGN PATENT DOCUMENTS

SU        0583397        12/1977        ............... 73/517 A (Continued)

OTHER PUBLICATIONS

"Rejecting Rotational Disturbance on Small Disk Drives Using Rotational Accelerometers" Daniel Y. Abramovitch, 1996, IFAC World Congress in San Francisco, CA 1996, pp. 1-6.

(Continued)

*Primary Examiner*—Helen Kwok
(74) *Attorney, Agent, or Firm*—Jimmy L. Funke

(57) ABSTRACT

A three-axis accelerometer is provided for sensing acceleration in three orthogonal axes. The accelerometer includes a support substrate, fixed electrodes having fixed capacitive plates fixed to the support substrate, and a movable inertial mass having movable capacitive plates capacitively coupled to the fixed capacitive plates. The accelerometer includes banks of fixed and movable capacitive plates oriented to sense acceleration in orthogonal X- and Y-axes. Additionally, the accelerometer includes fixed and movable capacitive plates having a height variation between adjacent plates to sense acceleration in the vertical Z-axis. Input signals are applied to certain electrodes coupled to the fixed capacitive plates, and an output signal is generated on the inertial mass, which is indicative of acceleration in each of the sensing axes. The output signal may be further processed to generate individual acceleration outputs for each of the sensing axes.

27 Claims, 7 Drawing Sheets

U.S. PATENT DOCUMENTS

| | | | |
|---|---|---|---|
| 4,851,080 A | 7/1989 | Howe et al. .................. | 156/647 |
| 5,006,487 A | 4/1991 | Stokes ........................ | 437/228 |
| 5,092,174 A | 3/1992 | Reidemeister et al. ........ | 73/517 |
| 5,146,389 A | 9/1992 | Ristic et al. ................. | 361/283 |
| 5,226,321 A | 7/1993 | Varnham et al. .............. | 73/505 |
| 5,233,213 A | 8/1993 | Marek ........................ | 257/415 |
| 5,249,465 A | 10/1993 | Bennett et al. ............... | 73/510 |
| 5,251,484 A | 10/1993 | Mastache ..................... | 73/517 |
| 5,253,526 A | 10/1993 | Omura et al. .................. | 73/517 |
| 5,310,450 A | 5/1994 | Offenberg et al. ........... | 156/630 |
| 5,314,572 A | 5/1994 | Core et al. ................... | 156/643 |
| 5,345,824 A | 9/1994 | Sherman et al. .............. | 73/517 |
| 5,349,858 A | 9/1994 | Yagi et al. ..................... | 73/517 |
| 5,388,460 A | 2/1995 | Sakurai et al. ................ | 73/517 |
| 5,417,111 A | 5/1995 | Sherman et al. .............. | 73/517 |
| 5,431,050 A | 7/1995 | Yamada ........................ | 73/517 |
| 5,487,305 A | 1/1996 | Ristic et al. | |
| 5,540,095 A | 7/1996 | Sherman et al. .............. | 73/514 |
| 5,569,852 A | 10/1996 | Marek et al. .................. | 73/514 |
| 5,578,755 A | 11/1996 | Offenberg .................... | 73/514 |
| 5,618,989 A | 4/1997 | Marek | |
| 5,665,915 A | 9/1997 | Kobayashi et al. ........... | 73/514 |
| 5,707,077 A | 1/1998 | Yokota et al. .............. | 280/735 |
| 5,731,520 A | 3/1998 | Stevenson et al. ............ | 73/514 |
| 5,780,885 A | 7/1998 | Diem et al. | |
| 5,847,280 A | 12/1998 | Sherman et al. .............. | 73/514 |
| 5,894,091 A * | 4/1999 | Kubota .................... | 73/504.12 |
| 5,939,633 A | 8/1999 | Judy | |
| 6,000,280 A | 12/1999 | Miller et al. | |
| 6,000,287 A | 12/1999 | Menzel ........................ | 73/514 |
| 6,013,933 A | 1/2000 | Foerstner et al. | |
| 6,199,430 B1 | 3/2001 | Kano et al. .................... | 73/514 |
| 6,257,062 B1 | 7/2001 | Rich ........................... | 73/514 |
| 6,428,713 B1 | 8/2002 | Christenson et al. .......... | 216/2 |
| 6,508,124 B1 | 1/2003 | Zerbini et al. ................ | 73/514 |
| 6,631,642 B2 | 10/2003 | Oguchi et al. | |
| 6,678,069 B1 | 1/2004 | Abe | |
| 6,679,995 B1 | 1/2004 | Banjac et al. | |
| 6,761,068 B1 | 7/2004 | Schmid | |
| 6,761,070 B2 | 7/2004 | Zarabadi et al. .............. | 73/514 |
| 6,785,117 B2 * | 8/2004 | Sakai et al. .................. | 361/280 |
| 6,848,310 B2 | 2/2005 | Goto | |
| 6,990,864 B2 * | 1/2006 | Sakai ........................ | 73/514.32 |
| 2003/0140700 A1 | 7/2003 | Zarabadi et al. | |
| 2003/0209076 A1 | 11/2003 | Miao et al. | |
| 2003/0210511 A1 | 11/2003 | Sakai et al. | |
| 2005/0235751 A1* | 10/2005 | Zarabadi et al. ......... | 73/514.01 |

FOREIGN PATENT DOCUMENTS

| | | | |
|---|---|---|---|
| SU | 1035523 | 8/1983 | ............... 73/517 A |
| SU | 1040424 | 9/1983 | ............... 73/517 A |
| WO | WO 02/103369 A1 | 12/2002 | |
| WO | 2004/077073 | 9/2004 | |

OTHER PUBLICATIONS

"Increased Disturbance Rejection in Magnetic Disk Drives by Acceleration Feedforward Control and Parameter Adaption" M.T. White and M. Tomizuka, vol. 5, No. 6, 1997, pp. 741-751.

"Surface Micromachined Angular Accelerometer with Force Feedback" T.J. Brosnihan, A.P. Pisano and R.T. Howe; DSC-vol. 57-2, 1995, IMECE pp. 941-947.

"Embedded Interconnect and Electrical Isolation for High-Aspect-Ratio, SOI Inertial Instruments" T.J. Brosnihan, J.M. Bustillo, A.P. Pisano and R.T. Howe; 1997 International Conference on Solid-State Sensors and Actuators, Chicago, Jun. 16-19, 1997, pp. 637-640.

"A Z-Axis Differential Capacitive SOI Accelerometer with Vertical Comb Electrodes," Toshiyuki Tsuchiya, Hirofumi Funabachi; Department of Mechanical Engineering, Kyoto University, Japan, Feb. 20, 2004, 8 pages.

"A Scanning Micromirror with Angular Comb Drive Actuation," Pamela R. Patterson, Dooyoung Hah, Hung Nguyen, Hiroshi Toshiyoshi, Rum-min Chao and Ming C. Wu; Electrical Engineering Department, University of California at Los Angels, IEEE 2002, pp. 544-547.

"Self-Aligned Vertical Electrostatic Combdrives for Micromirror Actuation," Ume Krishnamoorthy, Daesung Lee and Olav Solgaard; Journal of Microelectromechanical Systems, vol. 12, No. 4, Aug. 2003, pp. 458-464.

"Large-Displacement Vertical Microlens Scanner with Low Driving Voltage," Sunghoon Kwon, Veljko Milanovic and Luke Lee; IEEE Photonics Technology Letters, vol. 14, No. 11, Nov. 2002, pp. 1572-1574.

"A Novel Fabrication Method of a Vertical Comb Drive Using a Single SOI Wafer for Optical MEMS Applications," Ki-Hun Jeong and Luke Lee, The 12th International Conference on Solid State Sensors, Actuators and Microsystems, Boston, Jun. 8-12, 2003, pp. 1462-1465.

EP Search Report Dated Jul. 11, 2006.

* cited by examiner

MULTIPLE-AXIS LINEAR ACCELEROMETER

CROSS-REFERENCE TO RELATED APPLICATION

This application is a continuation-in-part of U.S. application Ser. No. 11/081,427 entitled "LINEAR ACCELEROMETER," filed on Mar. 16, 2005 now abandoned, the entire disclosure of which is hereby incorporated herein by reference.

TECHNICAL FIELD

The present invention generally relates to acceleration sensors (i.e. accelerometers) and, more particularly, relates to a micro-machined capacitively coupled accelerometer for sensing acceleration in multiple directions.

BACKGROUND OF THE INVENTION

Accelerometers are commonly employed to measure the second derivative of displacement with respect to time. In particular, linear accelerometers measure linear acceleration generally along a sensing axis. Linear accelerometers are frequently employed to generate an output signal (e.g., voltage) proportional to linear acceleration for use in any of a number of vehicle control and motion based systems. For example, the sensed output from a linear accelerometer may be used to control safety-related devices onboard an automotive vehicle, such as front and side impact air bags and rollover detection devices. According to other examples, accelerometers may be used in automotive vehicles for vehicle dynamics control and suspension control applications.

Conventional linear accelerometers often employ an inertial mass suspended from a support frame by multiple support beams. The mass, support beams and frame generally act as a spring mass system, such that the displacement of the mass is proportional to the linear acceleration applied to the frame. The displacement of the mass generates a voltage proportional to linear acceleration which, in turn, is used as a measure of the linear acceleration.

One type of an accelerometer is a micro-electromechanical structure (MEMS) sensor that employs a capacitive coupling between interdigitated fixed and movable capacitive plates that are movable relative to each other in response to linear acceleration. An example of a capacitive type single-axis linear accelerometer is disclosed in U.S. Pat. No. 6,761,070, entitled "MICROFABRICATED LINEAR ACCELEROMETER," the entire disclosure of which is hereby incorporated herein by reference. An example of a capacitive type dual-axis accelerometer is disclosed in U.S. application Ser. No. 10/832,666, filed on Apr. 27, 2004, entitled "DUAL-AXIS ACCELEROMETER," the entire disclosure of which is also hereby incorporated herein by reference.

Some conventional capacitive type accelerometers employ a vertical stacked structure to sense linear acceleration in the vertical direction. The stacked vertical structure typically has an inertial proof mass suspended between upper and lower fixed capacitive plates. The inertial proof mass moves upward or downward responsive to vertical acceleration. The measured change in capacitance between the proof mass and the fixed capacitive plates is indicative of the sensed acceleration. The vertical stacked structure employed in the aforementioned conventional linear accelerometer generally requires significant process complexities in the fabrication of the device using bulk and surface micro-machining techniques. As a consequence, conventional vertical sensing accelerometers typically suffer from high cost and undesired packaging sensitivity.

Recent efforts to advance the design and fabrication of accelerometers have included efforts to design a tri-axis acceleration microsensor. Prior known approaches have employed multi-sensing elements with special processing that typically requires both lateral and vertical oriented plates for capacitive sensing, and require a complex process to create sensing elements having complex angles that allow acceleration sensing in three different axes. Some proposed accelerometers have employed piezo-resistors included in the sensing device. Additionally, many prior known approaches employ electrode anchors fixed along the perimeter of the suspended proof mass, which results in unwanted sensitivity due to packaging induced stress.

Accordingly, it is therefore desirable to provide for an accelerometer that senses acceleration in multiple directions and does not suffer undesired packaging sensitivity and other drawbacks of prior known sensors. In particular, it is desirable to provide for a cost-effective linear accelerometer that may sense acceleration in multiple axes including both magnitude and direction of vertical acceleration.

SUMMARY OF THE INVENTION

In accordance with the teachings of the present invention, a multiple-axis accelerometer is provided for sensing acceleration in multiple axes. The accelerometer includes a support substrate, a first fixed electrode having one or more first fixed capacitive plates fixed to the support substrate, and a second fixed electrode having one or more second fixed capacitive plates fixed to the support structure. The accelerometer also includes a movable inertial mass having one or more first movable capacitive plates capacitively coupled to the one or more first fixed capacitive plates and one or more second movable capacitive plates capacitively coupled to the one or more second fixed capacitive plates. The accelerometer further includes a support structure for supporting the movable inertial mass and allowing linear movement of the inertial mass along multiple sensing axes relative to the support substrate upon experiencing linear acceleration along any of the multiple sensing axes. The first fixed capacitive plates and the first movable capacitive plates form a variable capacitor for sensing linear acceleration along a first sensing axis. The second fixed capacitive plates and second movable capacitive plates have a height variance and form a variable capacitor for sensing linear acceleration along a second sensing axis. The accelerometer has an input for providing input signals to one of the fixed and movable capacitive plates, and an output for receiving an output signal from the other of the fixed and movable capacitive plates which varies as a function of the capacitive coupling and is indicative of linear acceleration sensed in the multiple sensing axes.

The multiple-axis accelerometer senses acceleration along two or more sensing axes, including the vertical axis. By employing fixed and movable capacitive plates arranged to provide capacitive coupling with a height variation between opposing fixed and movable capacitive plates and by employing fixed and movable capacitive plates arranged to produce capacitive coupling with a gap width variation between opposing fixed and movable capacitive plates according to one embodiment, the accelerometer measures a signal indicative of magnitude and direction of acceleration in the vertical axis, in addition to both acceleration magnitude and direction in one or more other axes. According to one embodiment, the accelerometer senses acceleration magnitude and direction in three orthogonal axes, also referred to as a tri-axis accelerometer.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Referring to FIGS. 1-7, an accelerometer 10 is illustrated according to one embodiment of the present invention for sensing acceleration along multiple orthogonal sensing axes. The accelerometer 10 shown and described herein is a three-axis linear accelerometer for sensing linear acceleration in both upward and downward directions of the vertical Z-axis, and in both negative and positive directions in both the X-axis and the Y-axis, according to one embodiment. The Z-axis extends perpendicular to the plane defined by the X- and Y-axes. The accelerometer 10 may be employed as a two-axis accelerometer for sensing linear acceleration in either of the X- and Y-axes, or any combination of X-, Y- and Z-axes, in addition to the vertical Z-axis. Further, it should be appreciated that the accelerometer 10 could be employed to sense angular acceleration or angular velocity, such as angular acceleration or angular velocity about the Z-axis, in addition to linear acceleration along the vertical Z-axis.

The multiple-axis linear accelerometer 10 is a micromachined MEMS accelerometer sensor that may be formed with a top-side etching fabrication process as described in U.S. application Ser. Nos. 11/081,427 entitled "LINEAR ACCELEROMETER," and Ser. No. 11/081,422 entitled "METHOD OF MAKING MICROSENSOR," both filed on Mar. 16, 2005, the entire disclosures of which are hereby incorporated herein by reference. The top-side etching process advantageously allows for the easy formation of capacitive plates having different heights. It should be appreciated that other sensor fabrication processes may be employed to fabricate the accelerometer 10. For example, accelerometer 10 may employ a conventional etching approach as disclosed in U.S. Pat. Nos. 6,428,713 and 5,006,487, the entire disclosures of which are also hereby incorporated herein by reference.

The linear accelerometer 10 is fabricated on a supporting substrate 14, which may include a silicon substrate, according to one embodiment. The substrate 14 may be formed from a handle wafer having a bond oxide layer 52 formed on the top surface. Various electrical and mechanical components of the device are formed in an epitaxial (EPI) device layer above the substrate 14. An overlying cover 54 is partially shown in FIG. 7 positioned on top to enclose the accelerometer 10 to prevent contamination and damage, such as that caused by moisture and particles.

Figure 1:
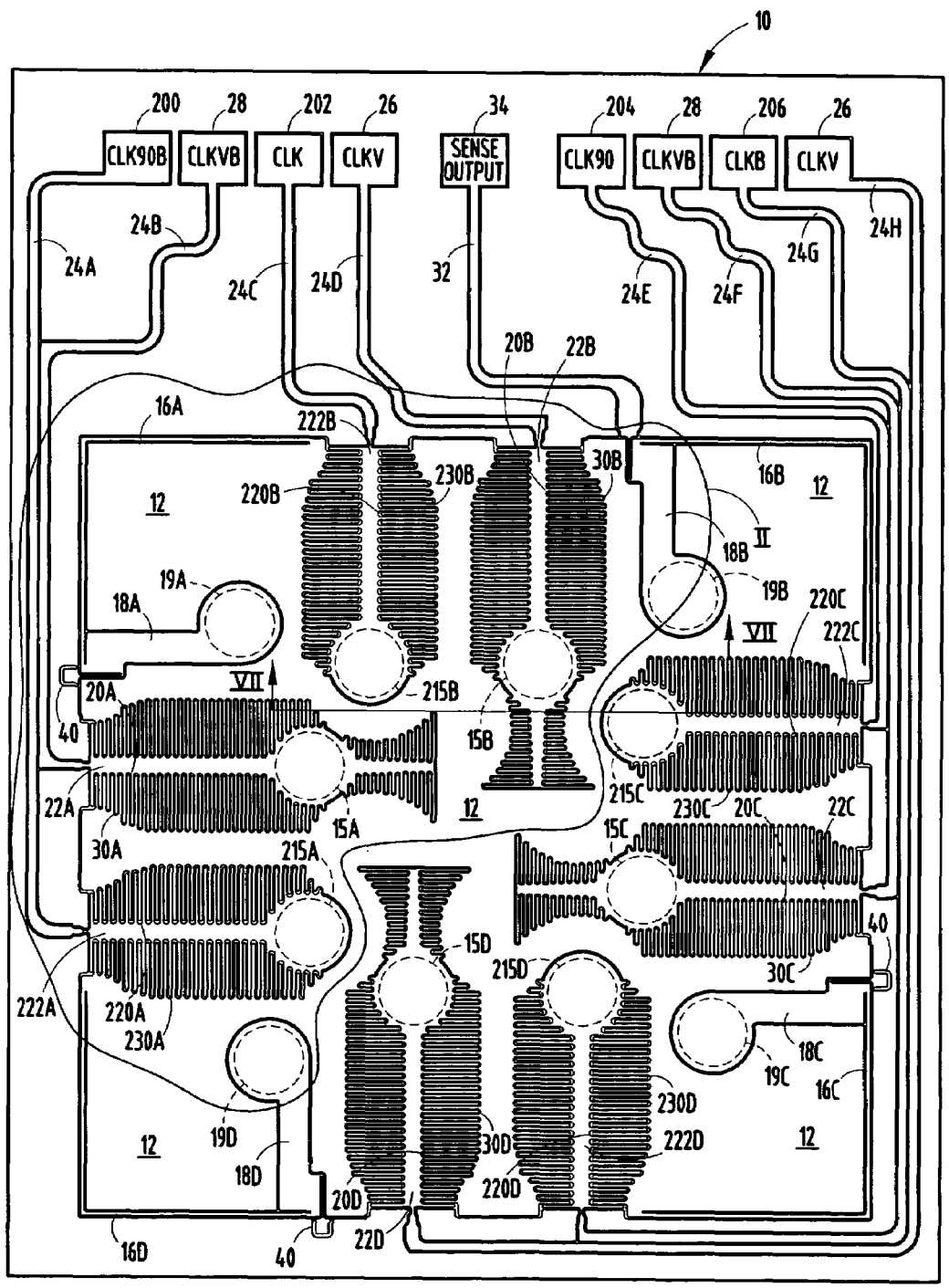
FIG. 1 is a top view of a three-axis (tri-axis) linear accelerometer shown with the overlying cover removed according to one embodiment of the present invention.
Figure 2:
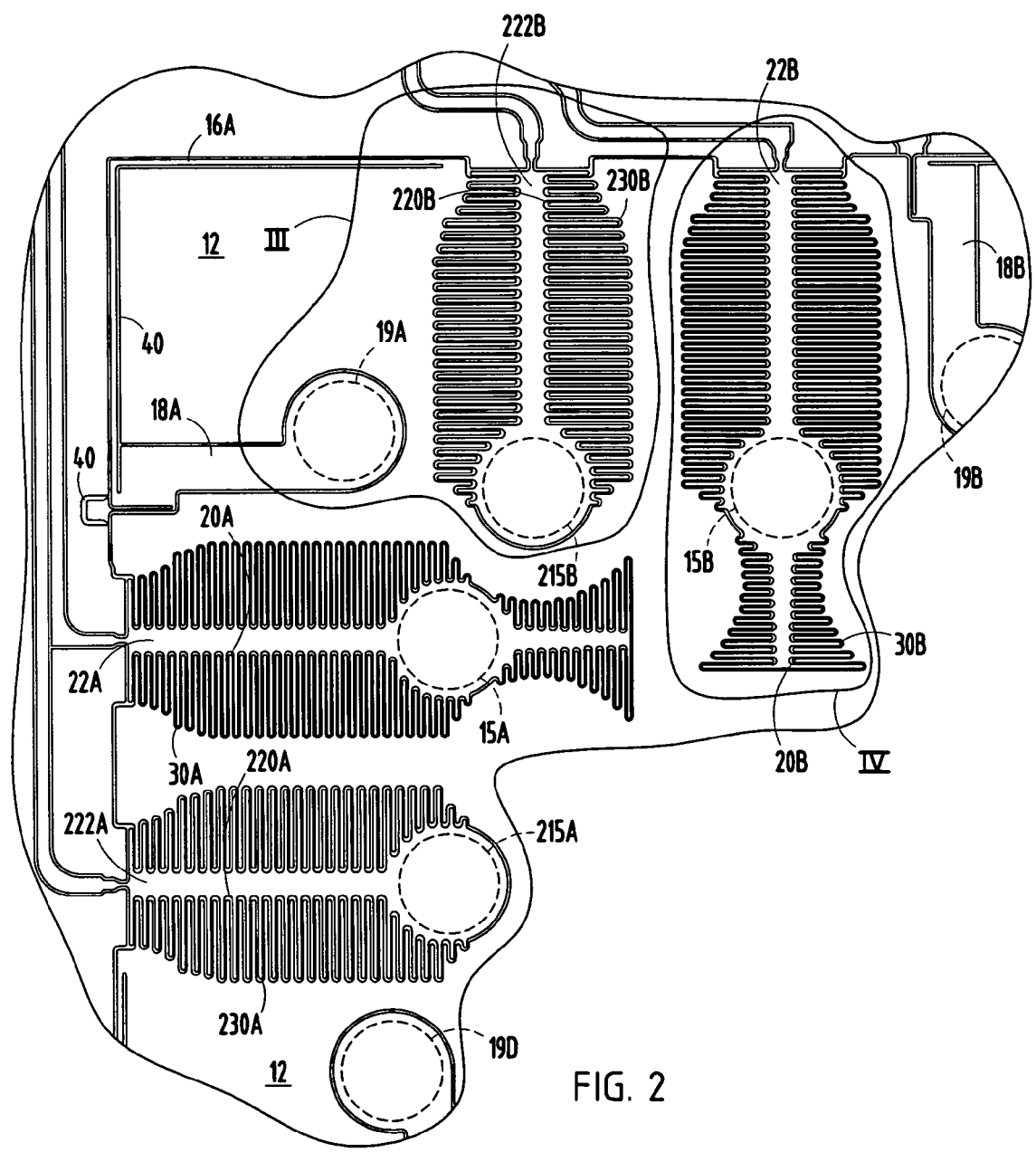
FIG. 2 is an enlarged view of section II of FIG. 1.

Formed on top of the supporting substrate 14 is an inertial proof mass 12 which extends over a cavity 50. The inertial mass 12 is shown in FIG. 1 having a central portion extending to each of four corner quadrants. However, the inertial mass 12 may be formed in any of a number of shapes and sizes. Inertial mass 12 is suspended from the support substrate 14 via a support structure, which, according to the embodiment shown, includes four bent generally L-shaped tethers 16A-16D. The inertial mass 12 is movable upward and downward relative to substrate 14 in a direction along the Z-axis when subjected to vertical acceleration. The inertial mass 12 is further movable in the X-axis and Y-axis when subjected to acceleration applied in the X- and Y-axes, respectively. Tethers 16A-16D may have any appropriate shape.

The four generally L-shaped tethers 16A-16D extend between the inertial mass 12 at one end and support anchored cantilevers 18A-18D, respectively, at the other end. Support anchored cantilevers 18A-18D are rigidly fixed to and cantilevered from the substrate 14 by respective anchors 19A-19D which are shown by hidden lines. The tethers 16A-16D have a length, width, depth and shape selected to achieve a desired resilient spring structure that flexes to allow inertial mass 12 to move a distance within a desired range when subjected to acceleration in any of the X-, Y-, and Z-axes. Together, the inertial mass 12 and tethers 16A-16D act as a spring mass system. It should be appreciated any one or more supporting structures may be employed to support the mass 12 according to other embodiments. For example, four folded beam tethers could be employed.

The movable inertial mass 12 has a plurality of rigid comb-like conductive fingers (plates) 20A-20D and 220A-220D that form movable capacitive plates. The movable inertial mass 12 includes first and third movable capacitive plates 20A and 20C each extending lengthwise in a direction along the Y-axis, and second and fourth movable capacitive plates 20B and 20D each extending lengthwise in a direction along the X-axis. The movable inertial mass 12 also includes fifth and seventh movable capacitive plates 220A and 220C each extending lengthwise in a direction along the Y-axis, and sixth and eighth movable capacitive plates 220B and 220D each extending lengthwise in a direction along the X-axis. Conductive plates 20A-20D and 220A-220D each are oriented with a height dimension extending with vertical Z-axis. Conductive plates 20A-20D are configured to sense Z-axis acceleration, conductive plates 220A and 220C are configured to sense X-axis acceleration, and conductive plates 220B and 220D are configured to sense Y-axis acceleration.

Figure 5:
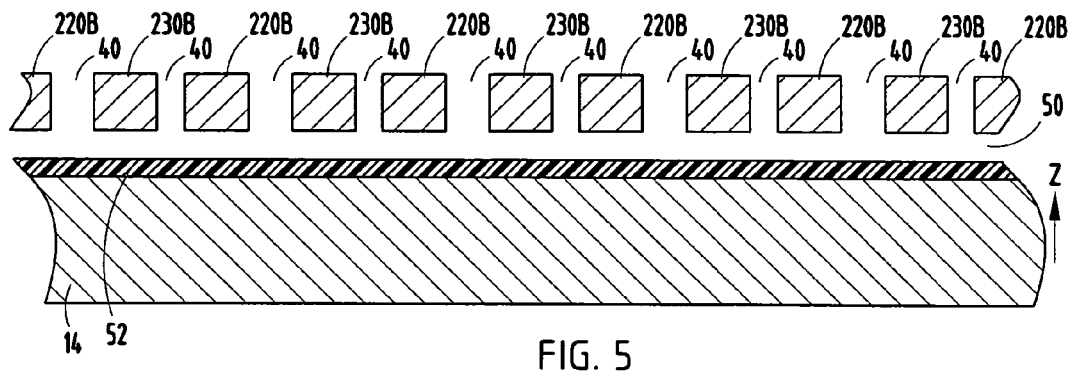
FIG. 5 is a cross-sectional view taken through lines V-V of FIG. 3 illustrating the fixed and movable capacitive plates for sensing acceleration in the X- and Y-axes.
Figure 6:
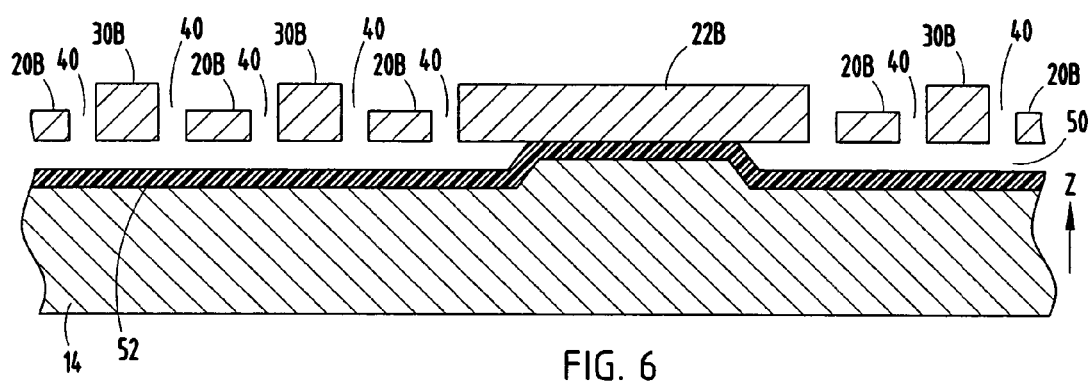
FIG. 6 is a cross-sectional view taken through lines VI-VI of FIG. 4 illustrating the fixed and movable capacitive plates for sensing acceleration in the vertical Z-axis.
Figure 7:
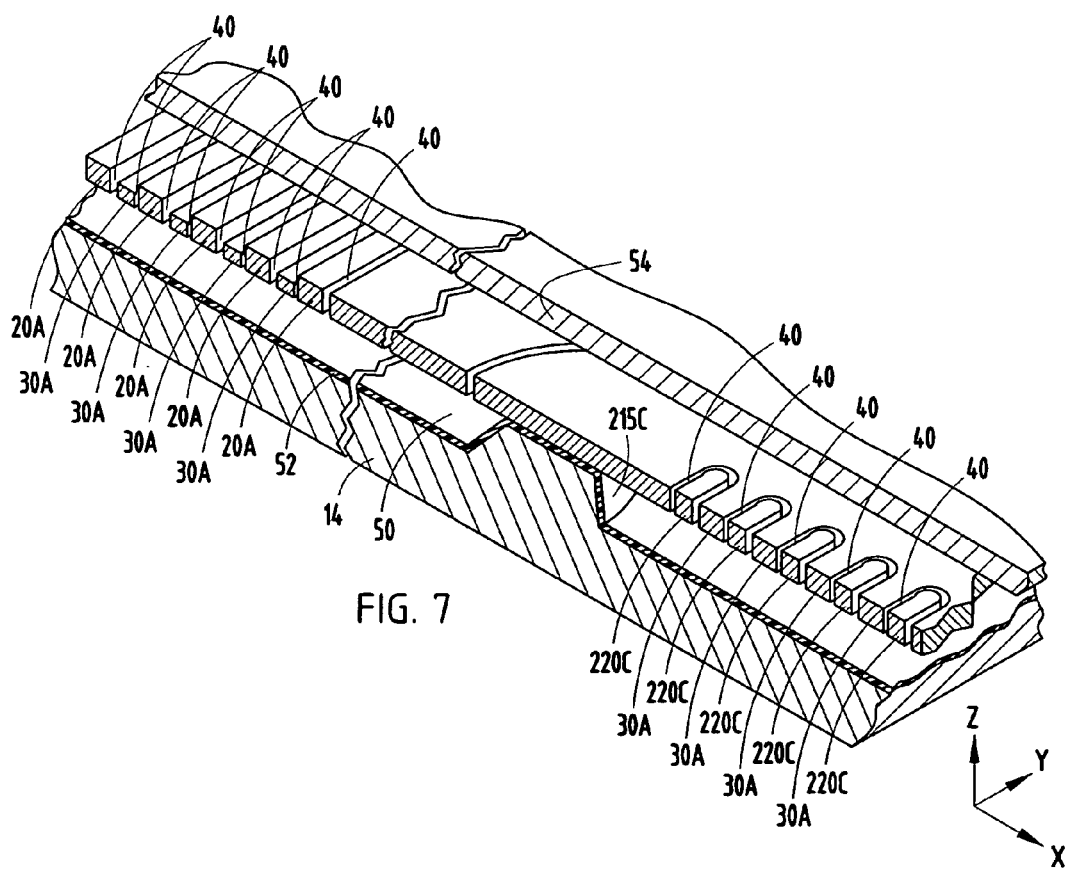
FIG. 7 is a partial cut away sectional view of the accelerometer taken through lines VII-VII of FIG. 1.

The inertial mass 12 with the comb-like conductive fingers (plates) 20A-20D and 220A-220D forms a movable electrode that moves linearly in the sensing Z-axis when subjected to a vertical acceleration along the sensing Z-axis. The inertial mass 12 moves linearly in the sensing X-axis when subjected to acceleration along the sensing X-axis. Similarly, the inertial mass 12 moves linearly in the sensing Y-axis when subjected to a vertical acceleration along the sensing Y-axis. For purposes of discussion herein, the X-axis and Y-axis are defined as shown oriented in FIG. 1, and the vertical Z-axis is defined as shown in FIGS. 5-7.

The linear accelerometer 10 also includes eight fixed electrodes 22A-22D and 222A-222D shown generally located in pairs at ninety degree (90°) increments. The fixed electrodes 22A-22D and 222A-222D generally extend from and are fixed to the support substrate 14 via respective anchors 15A-15D and 215A-215D located in regions close to the center of mass of the inertial mass 12. Thus, each of fixed electrodes 22A-22D and 222A-222D is fixedly supported to support substrate 14 at a location substantially inward of the outer perimeter and does not move relative to the support substrate 14. The generally central location of anchors 15A-15D and 215A-215D relieves the electrodes of unwanted packaging stress.

Each of the fixed electrodes 22A-22D and 222A-222D includes a plurality of fixed capacitive plates 30A-30D and 230A-230D, respectively, which are generally formed as a plurality of rigid comb-like conductive fingers. The fixed capacitive plates 30A-30D are formed to be parallel to and interdigitated with the movable capacitive plates 20A-20D, respectively, to form four banks of variable capacitors to sense acceleration in the Z-axis. Similarly, the fixed capacitive plates 230A-230D are formed to be parallel to and interdigitated with the movable capacitive plates 220A-220D, respectively, to form four additional banks of variable capacitors to sense acceleration in the X- and Y-axes. That is, the movable capacitive plates 20A-20D and 220A-220D are oriented parallel to and interdigitated with the plurality of fixed capacitive plates 30A-30D and 230A-230D, respectively, so that adjacent capacitive plates face each other in a juxtaposition such that a capacitive coupling is provided.

The first plurality of fixed capacitive plates 30A of the first fixed electrode 22A are interdisposed between adjacent first movable capacitive plates 20A of inertial mass (movable electrode) 12 generally in a first quadrant of the inertial mass 12. The first fixed electrode 22A has a signal input line 24B for receiving an input clocked signal CLKVB applied to input pad 28. The input signal CLKVB is a clocked signal having a first frequency (e.g., 250 kHz), such as a square wave signal according to one embodiment. The capacitive plates 20A and 30A thereby form a first bank of variable capacitors.

The third fixed electrode 22C likewise includes a third plurality of fixed capacitive plates 30C interdisposed between adjacent third movable capacitive plates 20C of inertial mass 12 generally in the third quadrant of inertial mass 12 to provide a third bank of variable capacitors. The third fixed electrode 22C has a signal input line 24F for also receiving the input clocked signal CLKVB applied to input pad 28. The bank of variable capacitors formed by capacitive plates 20C and 30C is generally symmetric with the first bank of variable capacitors formed by capacitive plates 20A and 30A.

The second fixed electrode 22B includes a second plurality of fixed capacitive plates 30B interdisposed between adjacent second movable capacitive plates 20B generally in the second quadrant of inertial mass 12 to provide a second bank of variable capacitors. The second fixed electrode 22B has a signal input line 24D for receiving an input clocked signal CLKV applied to input pad 26. Clocked signal CLKV has the first frequency and is one hundred eighty degrees (180°) out-of-phase, i.e., inverse, as compared to clocked signal CLKVB, according to one embodiment.

The fourth fixed electrode 22D includes fourth fixed capacitive plates 30D interdisposed between adjacent fourth movable capacitive plates 20D generally in the fourth quadrant of inertial mass 12 to provide a fourth bank of variable capacitors. The fourth fixed electrode 22D has a signal input line 24H for also receiving the input clocked signal CLKV applied to input pad 26. The fourth bank of variable capacitors is generally symmetric with the second bank of variable capacitors.

The fifth fixed electrode 222A includes a fifth plurality of fixed capacitive plates 230A interdisposed between adjacent fifth movable capacitive plates 220A of inertial mass 12 generally in the first quadrant of the inertial mass 12 to provide a fifth bank of variable capacitors for sensing X-axis acceleration. The fifth fixed electrode 222A has a signal input line 24A for receiving an input clocked signal CLK90B applied to input pad 200. The input signal CLK90B is a clocked signal having a second frequency (e.g., 125 kHz), such as a square wave signal, according to one embodiment. The capacitive plates 220A and 230A thereby form a first bank of variable capacitors for sensing X-axis acceleration.

The seventh fixed electrode 220C likewise includes a seventh plurality of fixed capacitive plates 230C interdisposed between adjacent seventh movable capacitive plate 220C of inertial mass 12 generally in the third quadrant of inertial mass 12 to provide a seventh bank of variable capacitors for sensing X-axis acceleration. The seventh fixed electrode 220C has a signal input line 24E for receiving an input clocked signal CLK90 applied to input pad 204. The input signal CLK90 is a clocked signal having the second frequency and is one hundred eighty degrees (180°) out-of-phase, i.e., inverse, as compared to clocked CLK90B, according to the embodiment shown. The seventh bank of variable capacitors formed by capacitive plates 220C and 230C is generally symmetric with the fifth bank of variable capacitors formed by capacitive plates 220A and 230A.

The sixth fixed electrode 222B includes a sixth plurality of fixed capacitive plates 230B interdisposed between adjacent sixth movable capacitive plates 220B generally in the second quadrant of inertial mass 12 to provide a sixth bank of variable capacitors for sensing Y-axis acceleration. The sixth fixed electrode 222B has a signal input line 24C for receiving an input clocked signal CLK applied to input pad 202. Clocked signal CLK is ninety degrees (90°) or two hundred seventy degrees (270°) out-of-phase, i.e., inverse, as compared to each of clocked signals CLK90B and CLK90, according to the embodiment shown.

The eighth fixed electrode 222D includes an eighth plurality of fixed capacitive plates 230D interdisposed between adjacent eighth movable capacitive plates 220D generally in the fourth quadrant of inertial mass 12 to provide an eighth bank of variable capacitors for sensing Y-axis acceleration. The eighth fixed electrode 222D has a signal input line 24G for receiving an input clocked signal CLKB applied to input pad 206. Clocked signal CLKB is one hundred eighty degrees (180°) out-of-phase, i.e., inverse, as compared to clocked signal CLK, according to the embodiment shown. The eighth bank of variable capacitors formed by capacitive plates 220D and 230D is generally symmetric with the sixth bank of variable capacitors formed by capacitive plates 220B and 230B.

Fixed electrodes 22A-22D and 222A-222D are electrically conductive and are dielectrically isolated from adjacent electrodes via isolation trenches 40 formed within the structure. Fixed electrodes 22A and 22D are electrically energized with input clocked signal CLKV, and fixed electrodes 22A and 22C are electrically energized with input clocked signal CLKVB, which is one hundred eighty degrees (180°) out-of-phase with signal CLKV. Fixed electrodes 222A-222D are electrically energized with out-of-phase input clocked signals CLKB90B, CLK, CLK90, and CLKB, respectively, each of which is sequentially out-of-phase by ninety degrees (90°). Signals CLKV and CLKVB have a first oscillation frequency, while signals CLK90B, CLK, CLK90, and CLKB each have a second oscillation frequency, which is different from the first frequency.

The sensed signal output line 32 is electrically coupled to inertial mass (movable electrode) 12 via the second bent tether 16B. The output line 32 is further connected to output pad 34 for supplying thereto the sensed output voltage (charge). The sensed output signal is the sensed voltage generated on inertial mass 12 due to changes in capacitance in any of the eight banks of variable capacitors caused by acceleration in any of the X-, Y-, and Z-axes. The sensed output signal is further processed by processing circuitry to determine the magnitude and direction of the sensed acceleration in each of the X-, Y-, and Z-sensing axes.

The electrical components formed in the EPI device layer over substrate 14 are formed by an etching process which removes material in the EPI layer, such as to form trenches. The input lines 24A-24H, input pads 26, 28, 200, 202, 204 and 206, output line 32, output pad 34, tethers 16A-16D, and isolation gaps between adjacent capacitive plates are formed as trenches 40. Trenches 40 provide both physical separation and electrical isolation. The reduced height for certain capacitive plates is formed by partially etching the capacitive plates on the EPI layer from the top side with a vertical mask and etch module to achieve the desired height.

Figure 3:
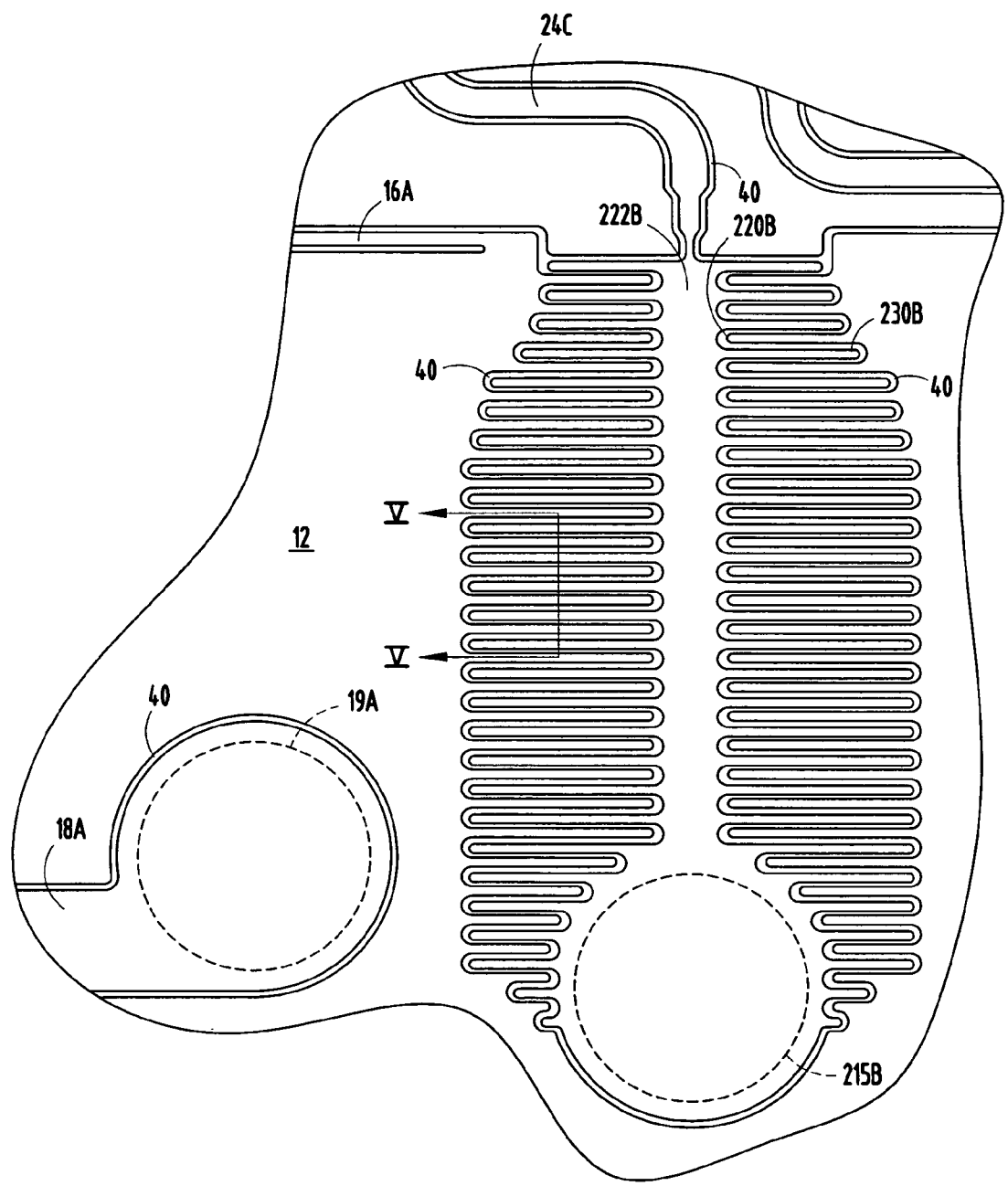
FIG. 3 is an enlarged view of section III of FIG. 2.

With particular reference to FIGS. 3 and 5, the adjacent fixed and movable capacitive plates 230B and 220B are shown spaced from each other by non-symmetric etched trenches 40 by two alternating isolation distances, according to one embodiment. That is, adjacent fixed and movable capacitive plates 230B and 220B are separated by a greater distance on one side as compared to the adjacent separation distance on the opposite side. Capacitive plates 230A, 230C and 230D are similarly spaced from respective capacitive plates 220A, 220C and 220D, according to this embodiment. The size ratio of non-symmetric gaps on opposite sides of a capacitive plate may be in the range of 2:1 to 5:1, according to one embodiment. In one example, the non-symmetric gaps have widths of 6 microns and 2.5 microns. By forming adjacent fixed and movable capacitive plates 230A-230D and 220A-220D configured having different gap widths 40, enables both the magnitude and direction of acceleration in the X- and Y-axes to be sensed.

Figure 4:
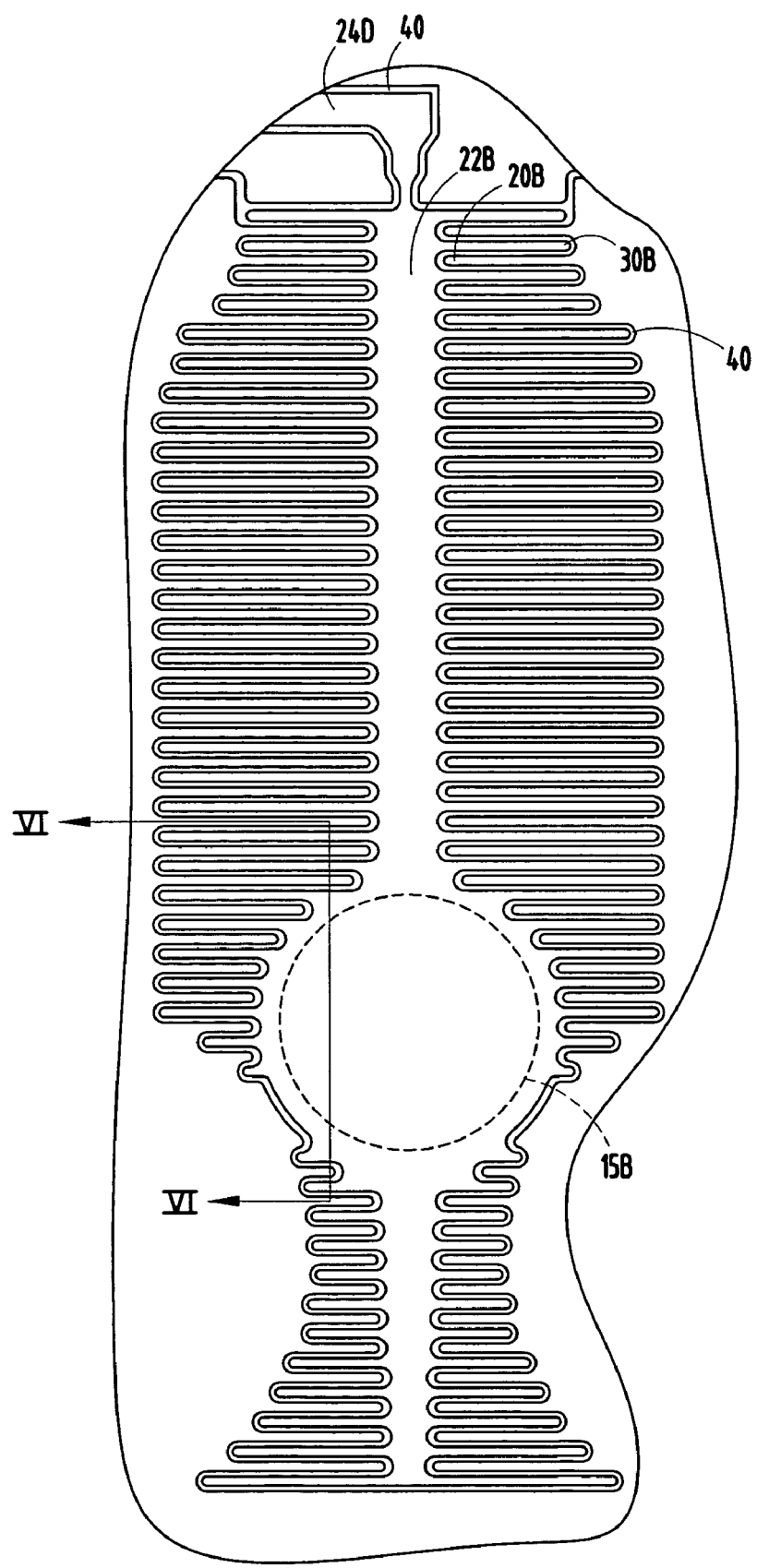
FIG. 4 is an enlarged view of section IV of FIG. 2.

With particular reference to FIGS. 4 and 6, the adjacent fixed and movable capacitive plates 30B and 20B are shown spaced from each other by etched trenches 40 which provide symmetric dielectric air gaps. The gaps allow the movable capacitive plates 20B to move relative to the fixed capacitive plates 30B. The adjacent fixed and movable capacitive plates 30B and 20B are spaced from each other on each side by equal distances, according to one embodiment. Capacitive plates 30A, 30C and 30D are similarly spaced from respective capacitive plates 20A, 20C and 20D, according to this embodiment. In one example, the symmetric gaps have a width of 2.5 microns.

Referring to FIGS. 6 and 7, adjacent fixed and movable capacitive plates 30A-30D and 20A-20D are shown configured having different heights to enable both the magnitude and direction of acceleration in the Z-axis to be sensed. That is, the linear accelerometer 10 is able to sense not only magnitude of vertical acceleration, but also the direction of the vertical acceleration, e.g., upward or downward direction of vertical acceleration.

The first and third movable capacitive plates 20A and 20C are formed having a height that is less than the height of the first and third fixed capacitive plates 30A and 30C. The reduced height of movable capacitive plates 20A and 20C is realized by etching the EPI layer on the top surface of the capacitive plates 20A and 20C to a reduced height. The height variance of capacitive plates 20A and 30A is illustrated in FIG. 7. Capacitive plates 20C and 30C are formed similar to capacitive plates 20A and 30A.

Capacitive plates 20A and 30A are formed so that the bottom edge of each adjacent plate is substantially at the same elevation when there is no vertical acceleration present. The fixed capacitive plates 30A have a height that is higher than the reduced height movable capacitive plates 20A by a predetermined distance. The capacitive plates 20A-20D and 30A-30D may have a uniform doping (e.g., P+ or N+) or two different dopings (e.g., P+/N+ or P+(P++)/N+(N++)), according to one embodiment.

Capacitive plates 20A and 30A have an effective overlapping area that determines the amount of capacitance generated by that bank of capacitors. The maximum area of the resulting capacitors is functionally the area of the smallest plate. The capacitance therefore is a function of the overlapping height of adjacent opposing capacitor plates. When the inertial mass 12 moves upward relative (or with respect) to substrate 14 by distance D due to downward acceleration, the overlapping height and area of the capacitor plates 20A and 30A remains the same (i.e., unchanged). When this happens there is no change in capacitance generated by these capacitive plates. When the inertial mass 12 moves downward with respect to substrate 14 by a distance due to upward acceleration, the overlapping height and area of the capacitor plates 20A and 30A is reduced. This causes a reduction in the capacitance generated by these capacitive plates. Thus, a change in capacitance of capacitive plates 20A and 30A is indicative of the direction as well as magnitude of the sensed acceleration.

The second and fourth movable capacitive plates 20B and 20D are formed having a height that is greater than the height of the second and fourth fixed capacitive plates 30B and 30D. The reduced height of the fixed capacitive plates 30B and 30D is realized by etching the EPI layer on the top surface of the capacitive plates connected to the second and fourth fixed electrodes 22B and 22D to a reduced height. The height variance of capacitive plates 20B and 30B is illustrated in FIG. 6. Capacitive plates 20D and 30D are formed similar to capacitive plates 20A and 30A.

Capacitive plates 20B and 30B are formed so that the bottom edge of each adjacent plate is substantially at the same elevation when there is no vertical acceleration present. The movable capacitive plates 20B have a height that extends higher than the reduced height fixed capacitive plates 30B by a predetermined distance.

Capacitive plates 20B and 30B have an effective overlapping area that determines the amount of capacitance generated by that bank of capacitors. The maximum area of the resulting capacitors is functionally the area of the smallest plate and, therefore, the capacitance is a function of the overlapping height of adjacent opposing capacitor plates. When the inertial mass 12 moves upward with respect to substrate 14 by a distance due to downward acceleration, the overlapping height and area of the capacitor plates 20B and 30B is reduced. This causes a reduction in the capacitance generated by these capacitive plates. Thus, a change in capacitance of capacitive plates 20B and 30B is indicative of the direction as well as magnitude of the sensed acceleration. When the inertial mass 12 moves downward with respect to substrate 14 by a distance due to upward acceleration, the overlapping height and area of the capacitor plates 20B and 30B remains the same (i.e., unchanged). When this happens there is no change in capacitance generated by these capacitive plates. Thus, no signal contribution to direction or magnitude is provided by this set of capacitors.

Capacitive plates 220A-220D and 230A-230D are formed having the same height, according to one embodiment. This is shown by capacitive plates 220B and 230B illustrated in FIG. 5.

The capacitive plates 20A-20D, 30A-30D, 220A-220D and 230A-230D may be configured in various shapes and sizes. According to one embodiment, each of the capacitive plates are generally rectangular. The reduced height capacitive plates may be reduced in height up to one-half the height of the extended height capacitive plates, according to one embodiment. In one example, the reduced height capacitive plates have a height of twenty-eight micrometers (28 μm) as compared to a height of thirty micrometers (30 μm) for the extended height capacitive plates.

Figure 8:
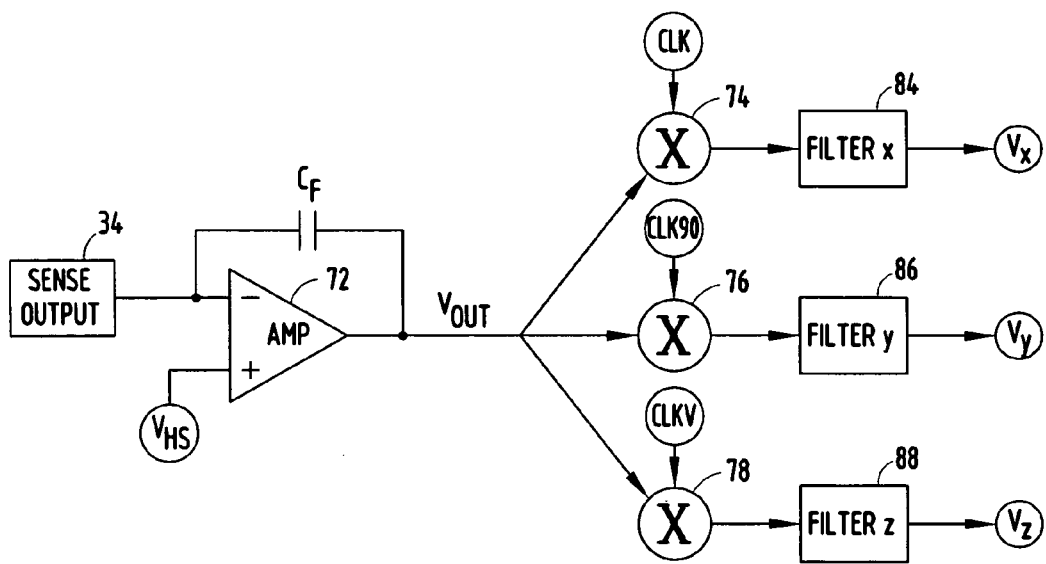
FIG. 8 is an exemplary block/circuit diagram illustrating processing of the sensed capacitance output.

Referring to FIG. 8, the output signal of accelerometer 10 is shown electrically coupled to signal processing circuitry, according to one embodiment. The sensed output signal at output pad 34 is input to a charge amplifier 72 and is further processed by each of three demodulators 74, 76 and 78 and filters 84, 86 and 88. A feedback path $C_F$ in the charge amplifier 72 serves to prevent overloads in the high frequency front-end amplifier section and to minimize signal distortions due to high frequency signal components. The amplifier 72 also receives a fixed voltage input $V_{HS}$. The charge amplifier 72 output voltage $V_{OUT}$ is input to the demodulators 74, 76 and 78, and the outputs of which are further processed by respective filters 84, 86 and 88, to generate the sensed acceleration in each of the corresponding axes, represented by $V_X$, $V_Y$ and $V_Z$.

Figure 9:
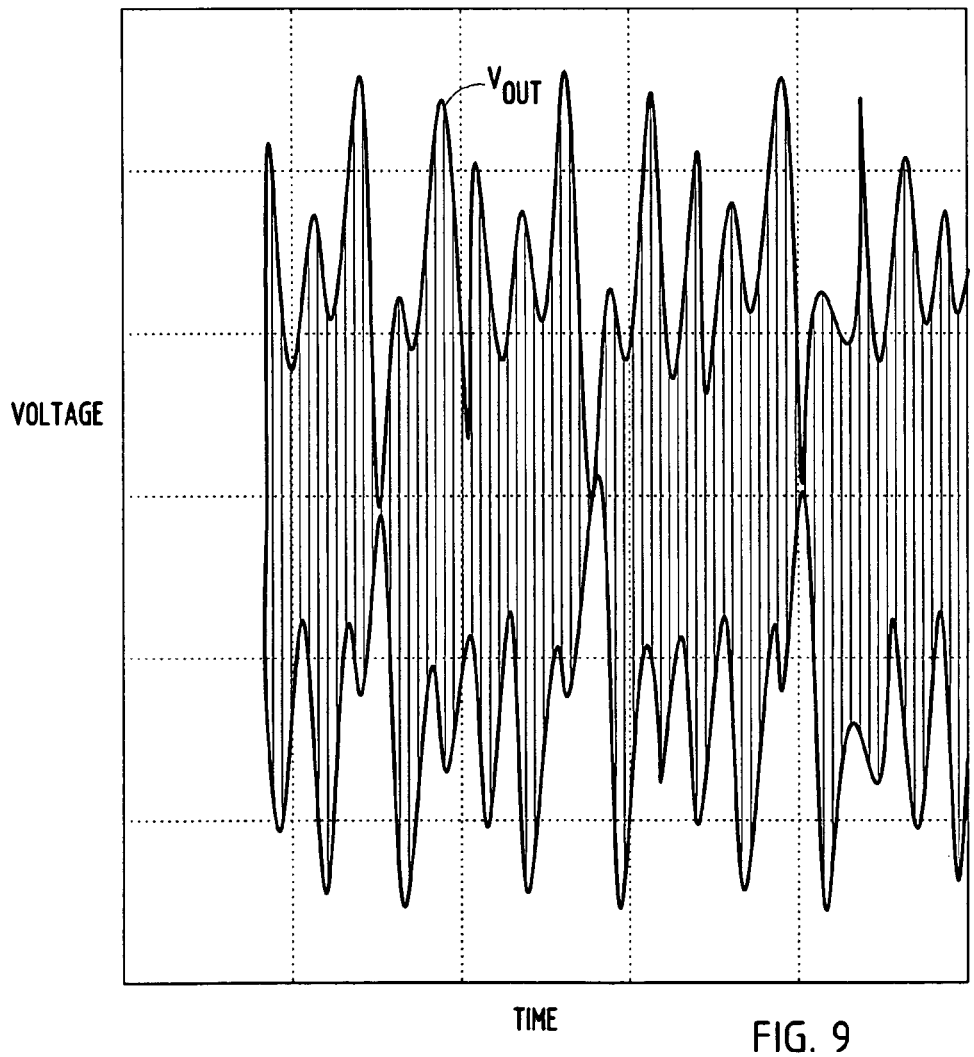
FIG. 9 is a signal waveform graph illustrating the voltage output signal $V_{OUT}$ processed by the signal processing circuit.

An example of output voltage $V_{OUT}$ is illustrated in FIG. 9 in the form of a sine wave for multiple frequencies modulated by corresponding clock signals of X-, Y- and Z-axes (CLK, CLK90, CLKV) during application of vibration to the accelerometer 10 causing acceleration in each of the three sensing axes. The output voltage $V_{OUT}$ at the sensed output 34 is a composite signal including responses to sensed acceleration in each of the three sensing axes. The output signal $V_{OUT}$ is processed by the demodulators 74, 76 and 78, and filters 84, 86 and 88, to output three distinct signals representing the acceleration components in each of the sensing axes.

Referring back to FIG. 8, the output $V_{OUT}$ is applied as an input to demodulator 74, which also receives the clocked input signal CLK. The demodulator 74 may be implemented in the form of a multiplier that multiplies the clocked input signal CLK by the output voltage $V_{OUT}$ to generate an output signal representing the X-axis component of acceleration. The output of demodulator 74 is then filtered by filter 84 to provide the X-axis acceleration signal $V_X$.

Similarly, the output $V_{OUT}$ is applied to demodulator 76, which is implemented as a multiplier. Demodulator 76 receives clocked input signal CLK90 which is multiplied by the output $V_{OUT}$ to generate a signal indicative of the Y-axis acceleration component. The demodulated signal is applied to filter 86 to generate the Y-axis acceleration signal $V_Y$.

Demodulator 78 multiplies the output voltage $V_{OUT}$ by clocked input signal CLKV. Demodulator 78 may be implemented as a multiplier multiplying the signal CLKV by output $V_{OUT}$ to generate the Z-axis acceleration component. The output of demodulator 78 is filtered by filter 88. The filtered output is the Z-axis vertical acceleration $V_Z$, which includes an indication of the amplitude and direction of sensed vertical acceleration.

Figure 10:
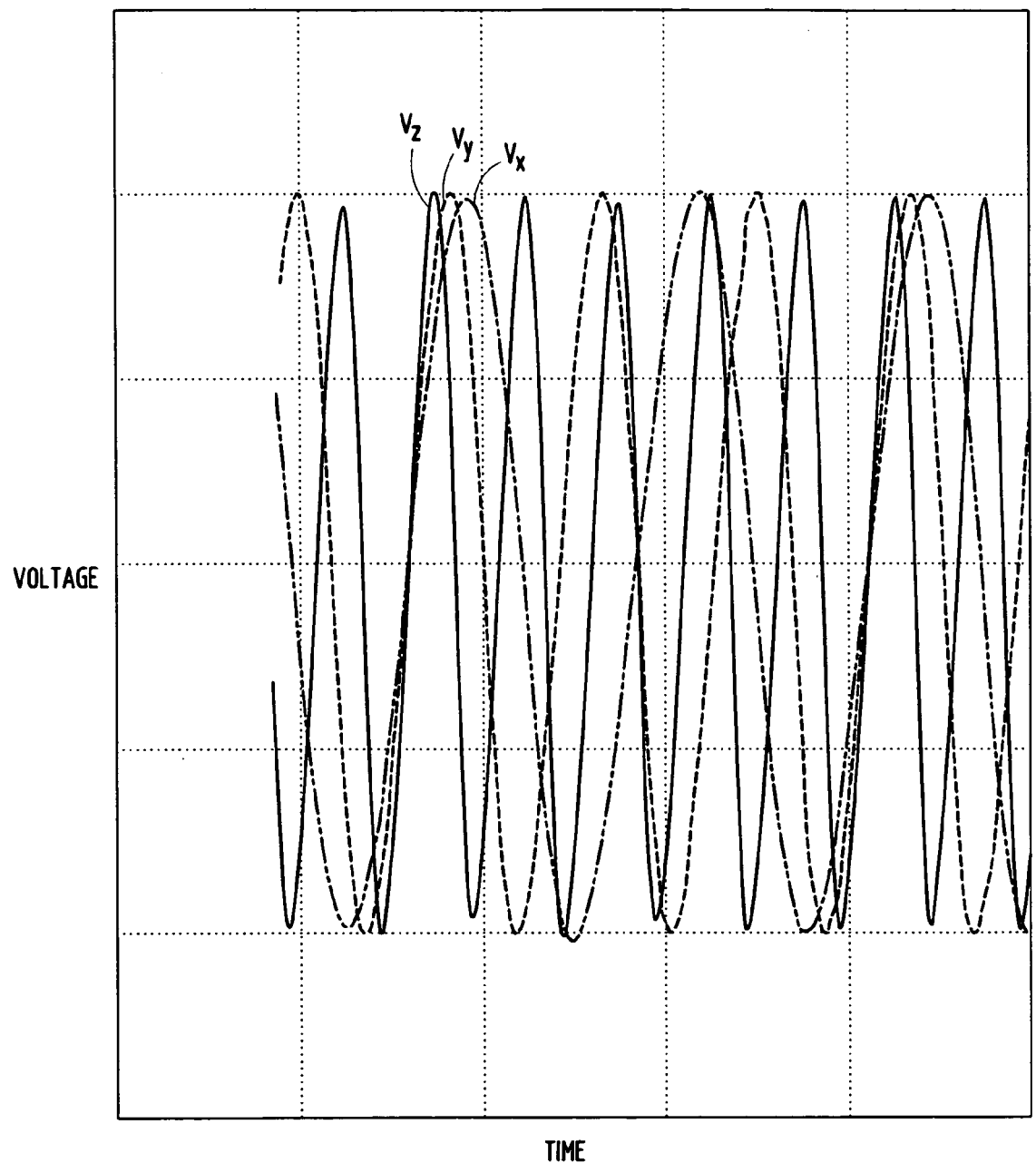
FIG. 10 is a signal waveform graph illustrating the individual accelerations sensed in each of the X-, Y- and Z-axes as processed by the signal processing circuit.

Referring to FIG. 10, the demodulated and filtered acceleration output signals $V_X$, $V_Y$ and $V_Z$ are illustrated therein. It should be noted that the X-, Y- and Z-axes sensed output accelerations $V_X$, $V_Y$ and $V_Z$ have different frequencies, with respect to each other, and thus is distinguished therefrom based on the difference in frequency and demonstrating that the acceleration signals can be fully separated with no cross-talk amongst the output signals. Therefore, the processing circuit processes the composite signal $V_{OUT}$ to generate the individual acceleration components, $V_X$, $V_Y$ and $V_Z$ in each of the sensing axes.

The four banks of variable capacitors for sensing vertical acceleration may be represented as four electromechanical capacitors C1-C4. Capacitor C1 is formed by capacitive plates 20A and 30A, capacitor C2 is formed by capacitive plates 20C and 30C, capacitor C3 is formed by capacitive plates 20B and 30B, and capacitor C4 is formed by capacitive plates 20D and 30D. Thus, capacitors C1 and C2 receive input clocked signal CLKVB and capacitors C2 and C4 receive input clocked signal CLKV.

The output voltage $V_{OUT}$ due to vertical acceleration may be represented by $V_{OUTZ}$ in the following equation: $V_{OUTZ}=[(C3+C4)-(C1+C2)]/C_F$. When the inertial mass 12 moves downward, output voltage $V_{OUTZ}$ may be represented by the following simplified equation: $V_{OUTZ}=-(2*\Delta C)*CLKV/C_F$, where $\Delta C$ represents the change in capacitance of capacitors C3 and C4. When the inertial mass 12 moves upward, then the output voltage $V_{OUTZ}$ may be represented by the following simplified equation: $V_{OUTZ}=+(2*\Delta C)*CLKV/C_F$, where $\Delta C$ represents the change in capacitance of capacitors C1 and C2.

The output voltage $V_{OUT}$ due to acceleration in the X- and Y-axes may be represented by $$V_{OUTX,Y} = \pm \frac{2\Delta C \cdot (CLK, CLK90)}{C_F},$$

where $\Delta C$ represents the change in capacitance of the X- or Y-axis.

Accordingly, the accelerometer 10 of the present invention advantageously measures acceleration applied in all of three sensing axes. By employing movable capacitive plates having a height different than the adjacent fixed capacitive plates, the accelerometer 10 senses magnitude of acceleration as well as the direction of the acceleration along the vertical Z-sensing axis. The accelerometer 10 employs an anchored design that eliminates sensitivity to packaging stress, and is also insensitive to structural asymmetries, fabrication processing, packaging, handling impulsive shocks and temperature-induced stresses. The accelerometer 10 advantageously provides high gain to linear acceleration sensed along the sensing axes, while rejecting off-axes accelerations.

While the accelerometer 10 is shown and described herein as a three-axis linear accelerometer, it should be appreciated that accelerometer 10 may be configured to sense acceleration in two or more sensing axes. It should further be appreciated that the accelerometer 10 may be configured to sense angular acceleration or angular velocity.

The accelerometer 10 shown provides eight variable capacitors arranged in four symmetric quarters. However, it should be appreciated that a plurality of variable capacitors may be provided in other symmetries, such as one-half symmetries. It should also be appreciated that additional signal pads may be formed on the accelerometer 10. This may include a low impedance electrical ground connection to minimize electrical feedthrough components, an isolation pad, and a pad to create pseudo-differential electrical connection(s) between the sensor 10 and readout electronic circuitry of the signal of signal processing integrated circuitry (IC).

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A multiple-axis linear accelerometer for sensing acceleration in multiple-axes comprising:
    a support substrate;
    a first fixed electrode comprising one or more first fixed capacitive plates fixed to the support substrate;
    a second fixed electrode comprising one or more second fixed capacitive plates fixed to the support structure;
    a movable inertial mass comprising one or more first movable capacitive plates capacitively coupled to the one or more first fixed capacitive plates and one or more second movable capacitive plates capacitively coupled to the one or more second fixed capacitive plates, wherein the first fixed capacitive plates and the first movable capacitive plates form a variable capacitor for sensing linear acceleration along a first sensing axis, and wherein the second fixed capacitive plates and second movable capacitive plates have a height variance and form a variable capacitor for sensing linear acceleration along a second sensing axis;
    a support structure for supporting the movable inertial mass and allowing linear movement of the inertial mass along multiple sensing axes relative to the support substrate upon experiencing linear acceleration along any of the multiple sensing axes;
    an input for providing input signals to one of the first and second fixed and first and second movable capacitive plates; and
    an output for receiving an output signal from the other of the first and second fixed and first and second movable capacitive plates which varies as a function of capacitive coupling and is indicative of linear acceleration sensed in the multiple sensing axes.

2. The accelerometer as defined in claim 1 further comprising a third fixed electrode comprising one or more third fixed capacitive plates fixed to the support structure, and wherein the movable inertial mass further comprises one or more third movable capacitive plates capacitively coupled to the one or more third fixed capacitive plates for forming a variable capacitor to sense acceleration along a third sensing axis.

3. The accelerometer as defined in claim 2, wherein the first, second and third sensing axes are orthogonal to one another.

4. The accelerometer as defined in claim 1, wherein the input comprises a first input signal applied to the first fixed electrode and a second input signal applied to the second fixed electrode, and wherein the output is electrically coupled to the movable inertial mass.

5. The accelerometer as defined in claim 1, wherein the first fixed capacitive plates are arranged substantially parallel to the first movable capacitive plates, and the second fixed capacitive plates are arranged substantially parallel to the second movable capacitive plates.

6. The accelerometer as defined in claim 1, wherein the support structure comprises a plurality of tethers.

7. The accelerometer as defined in claim 6, wherein the plurality of tethers comprises four L-shaped tethers.

8. The accelerometer as defined in claim 1, wherein the first and second fixed capacitive plates each comprises a plurality of capacitive plates, and wherein the first and second movable capacitive plates each comprises a plurality of capacitive plates.

9. The accelerometer as defined in claim 1 further comprising:
    a fourth fixed electrode comprising one or more fourth fixed capacitive plates, wherein the movable inertial mass further comprises one or more third movable capacitive plates forming a capacitive coupling with third fixed capacitive plates, and one or more fourth movable capacitive plates forming a capacitive coupling with the fourth fixed capacitive plates, and wherein the fourth movable and fixed capacitive plates have a height variation.

10. The accelerometer as defined in claim 1, wherein the first fixed capacitive plates and first movable capacitive plates are spaced by a symmetric gap, and the second fixed capacitive plates and second movable capacitive plates are spaced by an asymmetric gap.

11. A multiple-axis linear accelerometer for sensing acceleration in multiple-axes comprising:
    a support substrate;
    a first fixed electrode comprising one or more first fixed capacitive plates fixed to the support substrate;
    a second fixed electrode comprising one or more second fixed capacitive plates fixed to the support structure;
    a third fixed electrode comprising one or more third fixed capacitive plates fixed to the substrate;
    a movable inertial mass comprising one or more first movable capacitive plates capacitively coupled to the one or more first fixed capacitive plates, and one or more second movable capacitive plates capacitively coupled to the one or more second fixed capacitive plates, and one or more third movable capacitive plates capacitively coupled to the one or more third fixed capacitive plates, wherein the first fixed capacitive plates and the first movable capacitive plates form a variable capacitor for sensing linear acceleration along a first sensing axis, and wherein the second fixed capacitive plates and second movable capacitive plates have a height variance and form a variable capacitor for sensing linear acceleration along a second sensing axis, and further wherein the third fixed capacitive plates and third movable capacitive plates form a variable capacitor for sensing linear acceleration along a third sensing axis;
a support structure for supporting the movable inertial mass and allowing linear movement of the inertial mass along multiple sensing axes relative to the support substrate upon experiencing linear acceleration along any of the multiple sensing axes;
an input for providing input signals to one of the first, second and third fixed and first, second and third movable capacitive plates; and
an output for receiving an output signal from the other of the first, second and third fixed and first, second and third movable capacitive plates which varies as a function of the capacitive coupling and is indicative of linear acceleration sensed in the multiple sensing axes.

12. The accelerometer as defined in claim 11, wherein the input comprises a first input signal applied to the first fixed electrode, a second input signal applied to the second fixed electrode, and a third input signal applied to the third fixed electrode, and wherein the output is electrically coupled to the movable inertial mass.

13. The accelerometer as defined in claim 11, wherein the first fixed capacitive plates are arranged substantially parallel to the first movable capacitive plates, the second fixed capacitive plates are arranged substantially parallel to the second movable capacitive plates, and the third fixed capacitive plates are arranged substantially parallel to the third movable capacitive plates.

14. The accelerometer as defined in claim 11, wherein the support structure comprises a plurality of tethers.

15. The accelerometer as defined in claim 11, wherein the first fixed capacitive plates and first movable capacitive plates are spaced by a symmetric gap, the second fixed capacitive plates and second movable capacitive plates are spaced by an asymmetric gap, and wherein the third fixed capacitive plates and third movable capacitive plates are separated by a symmetric gap.

16. A linear accelerometer for sensing acceleration in multiple sensing axes comprising:
a support substrate;
a first bank of variable capacitors formed of one or more first fixed capacitive plates and one or more first movable capacitive plates for sensing acceleration along a first sensing axis, wherein the first fixed capacitive plates have a height different than a height of the first movable capacitive plates;
a second bank of variable capacitors formed of one or more second fixed capacitive plates and one or more second movable capacitive plates for sensing acceleration along a second sensing axis;
an inertial mass that is linearly movable in response to linear acceleration along any of multiple sensing axes, wherein the inertial mass includes the first and second movable capacitive plates;
a support structure for supporting the inertial mass and allowing movement of the inertial mass upon experiencing linear acceleration along any of the multiple sensing axes;
a first input for supplying an input signal to the first bank of variable capacitors;
a second input for supplying an input signal to the second bank of variable capacitors; and
an output for sensing an output signal from the first and second variable capacitors indicative of linear acceleration sensed along the multiple sensing axes in response to movement of the inertial mass.

17. The accelerometer as defined in claim 16 further comprising a third bank of variable capacitors formed of a third plurality of fixed capacitive plates and a third plurality of movable capacitive plates for sensing linear acceleration along a third sensing axis.

18. The accelerometer as defined in claim 16 further comprising:
a third bank of variable capacitors formed of a third plurality of fixed capacitive plates and a third plurality of movable capacitive plates for sensing acceleration along the first sensing axis, wherein the third plurality of fixed capacitive plates have a height different than the height of the third plurality of movable capacitive plates; and
a fourth bank of variable capacitors formed of a fourth plurality of fixed capacitive plates and a fourth plurality of movable capacitive plates for sensing acceleration along the second sensing axis.

19. The accelerometer as defined in claim 16, wherein the first and second input signals are clocked signals.

20. The accelerometer as defined in claim 16, wherein the fixed capacitive plates are arranged substantially parallel to adjacent movable capacitive plates.

21. The accelerometer as defined in claim 16, wherein the support structure comprises a plurality of tethers.

22. The accelerometer as defined in claim 16, wherein the first bank of variable capacitors have a symmetric gap between adjacent first fixed and movable capacitive plates, and wherein the second bank of variable capacitors have an asymmetric gap between adjacent second fixed and movable capacitive plates.

23. A linear accelerometer for sensing acceleration in multiple sensing axes comprising:
a support substrate;
a first bank of variable capacitors formed of one or more first fixed capacitive plates and one or more first movable capacitive plates for sensing acceleration along a first sensing axis, wherein the first fixed capacitive plates have a height different than a height of the first movable capacitive plates;
a second bank of variable capacitors formed of one or more second fixed capacitive plates and one or more second movable capacitive plates for sensing acceleration along a second sensing axis;
a third bank of variable capacitors formed of one or more third fixed capacitive plates and one or more third movable capacitive plates for sensing linear acceleration along a third sensing axes;
an inertial mass that is linearly movable in response to linear acceleration along any of the first, second and third sensing axes, wherein the inertial mass includes the first, second and third movable capacitive plates;
a support structure for supporting the inertial mass and allowing movement of the inertial mass upon experiencing linear acceleration along any of the first, second and third sensing axes;
a first input for supplying an input signal to the first bank of variable capacitors;
a second input for supplying an input signal to the second bank of variable capacitors;
a third input for supplying an input signal to the third bank of variable capacitors; and
an output for sensing an output signal from the first, second and third variable capacitors indicative of linear acceleration sensed along the first, second and third sensing axes in response to movement of the inertial mass.

24. The accelerometer as defined in claim 23 further comprising:
- a fourth bank of variable capacitors formed of a fourth plurality of fixed capacitive plates and a fourth plurality of movable capacitive plates for sensing acceleration along the first sensing axis, wherein the fourth plurality of fixed capacitive plates have a height different than a height of the fourth plurality of movable capacitive plates;
- a fifth bank of variable capacitors formed of a fifth plurality of fixed capacitive plates and a fifth plurality of movable capacitive plates for sensing acceleration along the second sensing axis; and
- a sixth bank of variable capacitors formed of a sixth plurality of fixed capacitive plates and a sixth plurality of movable capacitive plates for sensing acceleration along the third sensing axis.

25. The accelerometer as defined in claim 23, wherein the first, second and third banks of variable capacitors sense linear acceleration in first, second and third sensing axes which are substantially orthogonal to each other.

26. The accelerometer as defined in claim 23, wherein the first bank of variable capacitors have a symmetric gap between adjacent first fixed and first movable capacitive plates, wherein the second bank of variable capacitors have an asymmetric gap between adjacent second fixed and second movable capacitive plates, and wherein the third bank of variable capacitors comprises an asymmetric gap between adjacent third fixed and third movable capacitive plates.

27. The accelerometer as defined in claim 24, wherein the accelerometer further comprises:
- a seventh bank of variable capacitors formed of a seventh plurality of fixed capacitive plates and a seventh plurality of movable capacitive plates for sensing acceleration along the first sensing axis; and
- an eighth bank of variable capacitors formed of an eighth plurality of fixed capacitive plates and an eighth plurality of movable capacitive plates for sensing acceleration along the first sensing axis.

* * * * *